(12) United States Patent
Duerring

(10) Patent No.: US 11,146,603 B2
(45) Date of Patent: *Oct. 12, 2021

(54) SYSTEMS AND METHODS FOR AUTOMATED REAL-TIME INTERNET STREAMING AND BROADCASTING

(71) Applicant: Subsplash IP, LLC, Seattle, WA (US)

(72) Inventor: Brian Christopher Duerring, Cleves, OH (US)

(73) Assignee: Supsplash IP, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,914

(22) Filed: Dec. 6, 2019

(65) Prior Publication Data

US 2020/0112596 A1   Apr. 9, 2020

Related U.S. Application Data

(63) Continuation of application No. 16/005,771, filed on Jun. 12, 2018, now Pat. No. 10,523,725, which is a continuation of application No. 15/409,901, filed on Jan. 19, 2017, now Pat. No. 10,009,395, which is a continuation of application No. 14/799,888, filed on Jul. 15, 2015, now Pat. No. 9,912,710.

(60) Provisional application No. 62/024,565, filed on Jul. 15, 2014.

(51) Int. Cl.
| | |
|---|---|
| *H04L 29/06* | (2006.01) |
| *H04L 29/08* | (2006.01) |
| *G06F 16/70* | (2019.01) |

(52) U.S. Cl.
CPC ...... *H04L 65/4069* (2013.01); *H04L 65/4084* (2013.01); *H04L 67/32* (2013.01); *H04L 67/325* (2013.01); *G06F 16/70* (2019.01); *H04L 65/00* (2013.01)

(58) Field of Classification Search
CPC .............. G06F 17/30781; H04L 65/00; H04L 65/4069; H04L 65/4076; H04L 65/4084; H04L 67/32; H04L 67/325
See application file for complete search history.

(56) References Cited

U.S. PATENT DOCUMENTS

| | | | | |
|---|---|---|---|---|
| 9,167,275 | B1* | 10/2015 | Daily | H04N 21/6125 |
| 9,912,710 | B2* | 3/2018 | Duerring | H04L 65/4069 |
| 10,009,395 | B2* | 6/2018 | Duerring | H04L 65/4084 |
| 10,523,725 | B2* | 12/2019 | Duerring | H04L 67/325 |

(Continued)

*Primary Examiner* — Jeong S Park

(57) ABSTRACT

A real-time Internet streaming system and method includes a scheduling server that receives queries from encoders and determines if any scheduled events associated with a particular media encoders is an active scheduled event by comparing the scheduled events with time and date information. When there is an active scheduled event the scheduling server sends a response to the media encoders to stream a media stream to an origin server. When the scheduling server determines that an active scheduled event is no longer active, the scheduling server sends a response to the media encoders to stop streaming. The origin server can send the media stream or a modified version of the media stream to a plurality of viewing devices or archive the media stream for later playback. The real-time Internet streaming system can include a scheduling server, origin servers, and a plurality of encoders.

20 Claims, 6 Drawing Sheets

(56) References Cited

U.S. PATENT DOCUMENTS

| | | | |
|---|---|---|---|
| 2012/0002717 A1* | 1/2012 | Ma | H04L 65/607 |
| | | | 375/240.01 |
| 2013/0260796 A1* | 10/2013 | Hasek | H04L 67/32 |
| | | | 455/456.3 |
| 2014/0149771 A1* | 5/2014 | Krishna | G06F 16/41 |
| | | | 713/323 |
| 2015/0378979 A1* | 12/2015 | Hirzel | G06F 40/18 |
| | | | 715/220 |

* cited by examiner

SYSTEMS AND METHODS FOR AUTOMATED REAL-TIME INTERNET STREAMING AND BROADCASTING

CROSS-REFERENCE TO RELATED APPLICATIONS

This application is a continuation of U.S. application Ser. No. 16/005,771, entitled "SYSTEMS AND METHODS FOR AUTOMATED REAL-TIME INTERNET STREAMING AND BROADCASTING,", filed Jun. 12, 2018, which is a continuation of U.S. application Ser. No. 15/409,901, entitled "SYSTEMS AND METHODS FOR AUTOMATED REAL-TIME INTERNET STREAMING AND BROADCASTING,", filed Jan. 19, 2017, which is a continuation of U.S. application Ser. No. 14/799,888, entitled "SYSTEMS AND METHODS FOR AUTOMATED REAL-TIME INTERNET STREAMING AND BROADCASTING,", filed Jul. 15, 2015, which claims the benefit of U.S. Provisional Application No. 62/024,565, entitled "SYSTEMS AND METHODS FOR AUTOMATED REAL-TIME INTERNET STREAMING AND BROADCASTING," filed Jul. 15, 2014, the disclosures of which are hereby incorporated herein by reference in their entireties.

TECHNICAL FIELD

Embodiments of the technology relate, in general, to automated real-time Internet streaming of user-created content, and in particular to automation systems and methods that allow users to start, stop, and modify in real-time the broadcasting of live video streams over the Internet.

BRIEF DESCRIPTION OF THE DRAWINGS

The present disclosure will be more readily understood from a detailed description of some example embodiments taken in conjunction with the following figures.

DETAILED DESCRIPTION

Figure 1:
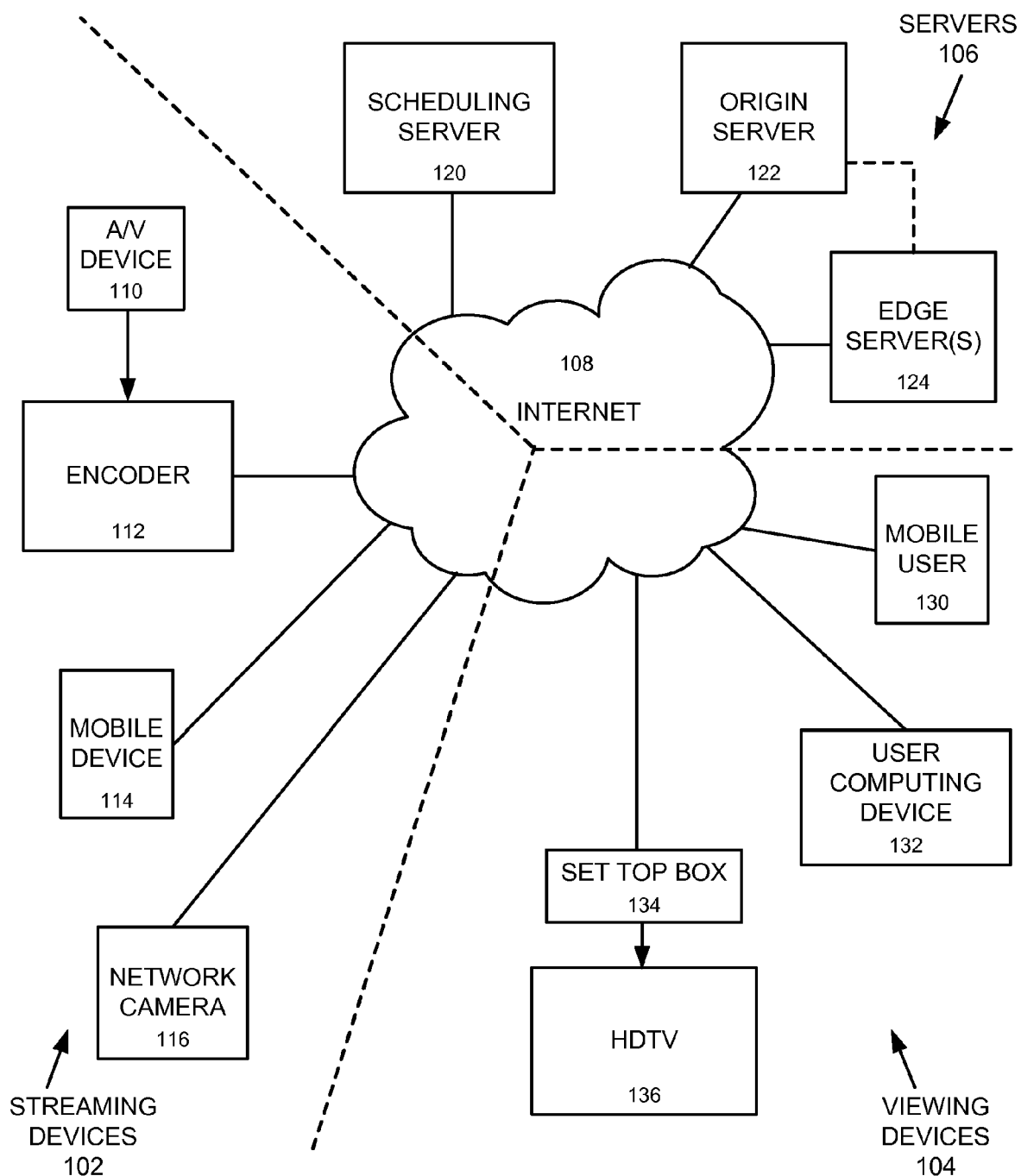
FIG. 1 depicts an example automated real-time Internet streaming system, according to one embodiment.

Various non-limiting embodiments of the present disclosure will now be described to provide an overall understanding of the principles of the structure, function, and use of automated real-time Internet streaming systems and methods disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Described herein are example embodiments of computer-based systems and methods that allow users, such as system administrators for houses of worship, educational environments, music halls, and other venues, to automate broadcasts and streaming of live audio and video content over the Internet to receivers, such as computers, mobile devices, and set top boxes. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Referring to FIG. 1, an embodiment of an automated real-time Internet streaming system 100 can include streaming devices 102 that stream live audio and video user-created content, viewing devices 104 that display the user-created content to a viewer, and servers 106 that receive, store, and stream the user-created content. Example streaming devices 102 can include A/V devices 110 (audio/video devices) that are connected to encoders 112, a mobile device 114 that has a camera and streaming software, and a networked camera 116. Generally, the streaming devices 102 capture and process audio/video content (A/V content) into a format suitable for transmission across the Internet 108 to a server 106. The encoding format can be proprietary or can be standards-based, for example, H.264, VP6, VP9 or MPEG-4 which is adapted for transmission of audio/video content using IP or Internet Protocol or standards-based RTSP or RTMP protocols.

An encoder 112 can be configured to accept the audio/video signals from an A/V device 110 that is not configured to stream A/V content and convert it to a format suitable for streaming across the Internet 108 to the servers 106. Mobile devices 114 can use software configured to take the A/V content from a camera and microphone on the mobile device 114 and stream it to a server 106, for example by sending it wirelessly through a local Wi-Fi/802.11x network or over a cellular data network (not separately shown). Network cameras 116 can be configured to stream A/V content to the server, for example using a wired connection to a local network, or using a wireless Wi-Fi/802.11x local network. The encoder 112, mobile device 114, and network camera 116 can each be a computing device, as described below, which executes software or other computer instructions for streaming A/V content and receiving formatted commands for initiating streaming operations.

In a configuration, a streaming device 102 can be a PC, Mac or Linux based computer capable of capturing and encoding audio and video inputs from cameras, video switchers, webcams, soundboards, microphones, and the like. The streaming device 102 can encode and transmit the encoded audio and video inputs for broadcast onto the Internet. In a configuration, the automation software residing on the streaming device 102 can include third-party software to parse responses from a RESTful API, or Representational State Transfer Application Programming Interface call such as WAMP Server for Windows-based computer. Linux and Mac based streaming device 102 can use the native PHP software to perform parsing of responses from the RESTful API calls.

Viewers can use a viewing device 104 to view streaming A/V content. Example viewing devices 104 can include mobile user devices 130, user computing devices 132, and set top boxes 134 among other types of viewing devices 104. A mobile user device 130 can be a mobile phone, a smartphone, a tablet, a laptop, a gaming device, or another portable computing device that can be configured to execute software or other computer instructions to receive streaming A/V content wirelessly through a local Wi-Fi/802.11x network, over a cellular data network, or any other suitable type of communication network. A user computing device 132 can be a personal computer, a workstation, a laptop, a tablet, a gaming device, an embedded device such as a computer in a kiosk, or any other suitable wired or another suitable computing device or a device that includes a computing device capable of receiving streaming A/V content over a wired or wireless data link. A set top box 134 can be a device configured to receive streaming A/V content and convert the A/V content to a format suitable for presentation on a television 136, monitor, projector, speaker system, and so forth. For example, a set top box 134 can be a Roku™ or AppleTV™ device that receives A/V content across a wired or wireless connection, and coverts the A/V content into a format suitable for playing on a television 136. An example format suitable for playing on a television is the HDMI, or high definition multimedia interface connection, although other types of connectors such VGA, BNC and RC connectors, and other types of signaling including analog or digital formats are contemplated. Other types of set top boxes, computing devices, and audio, video, or A/V signaling, as would be understood in the art, are also contemplated. In various configurations, the viewing devices 104 can receive just an audio stream, just a video stream, audio and video, multiple video streams, multiple audio streams, or other suitable combinations of audio and video content.

The servers 106 can include a scheduling server 120, an origin server 122, and one or more edge servers 124. The server 106 is illustrated as a single server 106 for convenience, however in practice the operations performed by each server 106 can be performed by a common server or servers, or executed across multiple servers 106 as would be understood in the art. The scheduling server 120 can have software or other computer instructions executing on processors that allows user, such as an administrator, to schedule live or future streaming of A/V content from the streaming devices 102. The scheduling instructions can be stored in a data store which can be in the scheduling server 120 or located elsewhere, such as a storage server on a local network, for example. In a configuration, the scheduling server 120 is a web-based PHP/MySQL™ application hosted on a cloud-based datacenter such as Amazon™. In a configuration, the origin server 122, and one or more edge servers 124 are servers 106 executing Wowza™ Streaming Engine and Wowza™ Media Server on an enterprise level operating system.

The origin server 122 is configured to receive streaming A/V content from one or multiple streaming devices 102 concurrently. The origin server 122 can transmit the data to one or more edge servers 124 for broadcast to viewing devices 104. In configurations, the origin server can store the A/V content locally or store the A/V content in a data store, for example a network storage server. In a configuration, the A/V content is stored by a third party cloud-based service such as Amazon™ S3™.

The edge server 124 receives A/V content from the origin server 122 for streaming to viewing devices 104. An edge server 124 can be directly connected to the origin server 122, for example using a physical link, or a dedicated network data link, as illustrated in FIG. 1 as the dotted line. In a configuration, the edge server 124 can use a data link over a Local Area Network LAN or the Internet 108 to connect using the Real Time Messaging Protocol (RTMP) to the origin server 122. An edge server 124 can be a physical server 106 configured to stream A/V content to viewing devices 104, or can be a cloud-based service provided by a third party such as Amazon™ Cloudfront™ One or more edge servers 124 can be used to stream A/V content to viewing devices 104. Separating the functions of the edge server 124 from the origin server 122, and scheduling server 120, can provide a number of benefits. First, there are typically more viewing devices 104 streaming A/V content than there are streaming devices 102 streaming the user-created content. For example, a house of worship may be streaming a single A/V stream of a Sunday morning service, while multiple users are concurrently viewing that same Sunday morning service, each on their own viewing device 104. Therefore, it can be beneficial to have multiple edge servers 124 in order to service the demand from all of the viewing devices 104. Second, keeping the processes of the origin server 122 separate from the edge server 124 can help to ensure that the origin server 122 has the necessary available computing and networking resources for receiving A/V content, and the scheduling server 120 has computing and networking resources available for scheduling streaming events, and being responsive to users using the user interface.

Each server 106, in accordance with the present disclosure, can be accessed via any appropriate and suitable technique. For example, a user such as an administrator can use a web-browser such as Safari™, Opera™, Google™ Chrome™, Internet Explorer™, or the like to access the scheduling server 120. A user such as a viewer desiring to stream A/V content can similarly use a web-browser such as Safari™, Opera™, Google™ Chrome™, Internet Explorer™, or the like to access the edge server 120. An application associated with the automated real-time Internet streaming system 100 can execute on a processor of an encoder 112, a mobile device 114, a network camera 116, a mobile user device 130, a user computing device 132, or a set top box 134 (collectively client devices). The application can be a web-based application or a stand-alone executable as appropriate for the client device. Client devices can communicate using any suitable communication channels and protocols. For example, all of the client devices of the automated real-time Internet streaming system 100 can use the Internet 108, as shown, as their communication network. Other suitable communication channels and protocols can include, without limitation, those used in mobile wireless communications as well as data links for wired and wireless networked connections. Each client device or server 106 can include software or other computer instructions executing on suitable computing hardware, such as a dedicated server, a personal computer, a server, multiple computers, a collection of networked computers, a cloud-based computer system, a web-based computer system, or from a storage device, as appropriate for the client device or server 106. Each client device or server 106 can include one or multiple processing units, such as central processing units and/or graphics processing units, may perform instructions stored in memory to execute the processes described herein.

Figure 2:
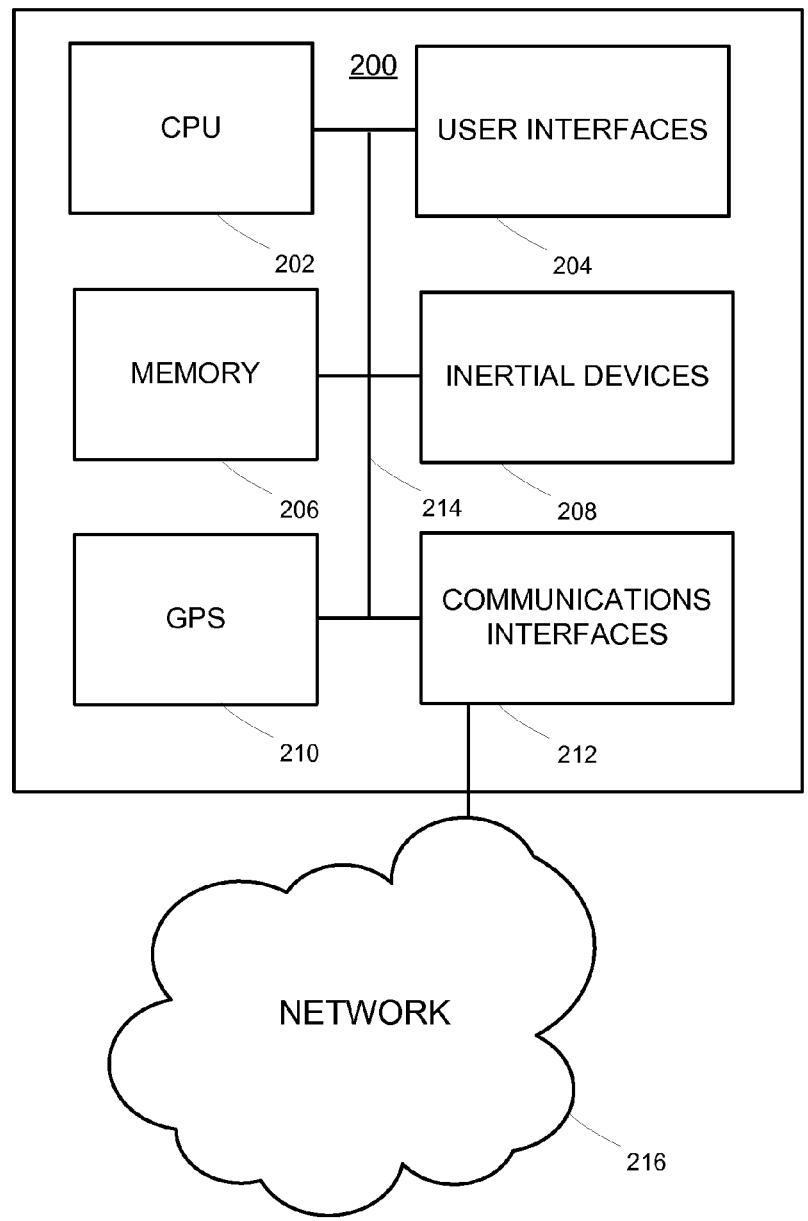
FIG. 2 depicts an example computing device, according to one embodiment.

Referring now to FIG. 2, an example computing device 200 is presented. The processes described herein can be performed on or between one or more computing devices 200. A computing device 200 can be a server, a computing device that is integrated with other systems or subsystems, a mobile computing device, a cloud-based computing capability, and so forth. For example, the computing device 200 depicted in FIG. 2 can be the streaming device 102, the server 106, or the viewing device 104. The computing device 200 can be any suitable computing device as would be understood in the art, including without limitation, a custom chip, an embedded processing device, a tablet computing device, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

Each computing device 200 includes one or more processors 202 that can be any suitable type of processing unit, such as a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 200 also includes one or more memories 206, for example read only memory (ROM), random access memory (RAM), cache memory associated with the processor 202, or other memories such as dynamic RAM (DRAM), static ram (SRAM), programmable ROM (PROM), electrically erasable PROM (EEPROM), flash memory, a removable memory card or disk, a solid state drive, and so forth. The computing device 200 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay™ disk, and so forth. Storage media such as flash drives, solid state hard drives, redundant array of individual disks (RAID), virtual drives, networked drives and other memory means including storage media on the processor 202, or memories 206 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 212 can be configured to transmit to, or receive data from, other computing devices 200 across a network 216. The network and communication interfaces 212 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 212 can include wired data transmission links such as Ethernet and TCP/IP. The communication interfaces 212 can include wireless protocols for interfacing with private or public networks 216. For example, the network and communication interfaces 212 and protocols can include interfaces for communicating with private wireless networks 216 such as a Wi-Fi network, one of the IEEE 802.11x family of networks, or another suitable wireless network. The network and communication interfaces 212 can include interfaces and protocols for communicating with public wireless networks 216, using for example wireless protocols used by cellular network providers, including Code Division Multiple Access (CDMA) and Global System for Mobile Communications (GSM). A computing device 200 can use network and communication interfaces 212 to communicate with hardware modules such as a database or data store, or one or more servers or other networked computing resources. Data can be encrypted or protected from unauthorized access, for example by using secure sockets, virtual private networks, and so forth.

Mobile computing devices can include inertial components 208 and global positioning systems components (GPS components 210). The inertial components 208 and GPS components 210 can determine the terrestrial position of the mobile computing devices. Mobile computing devices can use the inertial components 208 and GPS components 210 in combination with radio transmissions received via the network and communication interfaces 212 to accurately determine the position of a mobile computing device. The position can be transmitted to other computing systems.

In various configurations, the computing device 200 can include a system bus 214 for interconnecting the various components of the computing device 200, or the computing device 200 can be integrated into one or more chips such as programmable logic device or application specific integrated circuit (ASIC). The system bus 214 can include a memory controller, a local bus, or a peripheral bus for supporting input and output devices 204, and communication interfaces 212. Example input and output devices 204 include keyboards, keypads, gesture or graphical input devices, motion input devices, touchscreen interfaces, one or more displays, audio units, voice recognition units, vibratory devices, computer mice, and any other suitable user interface.

The processor 202 and memory 206 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

Figure 3:
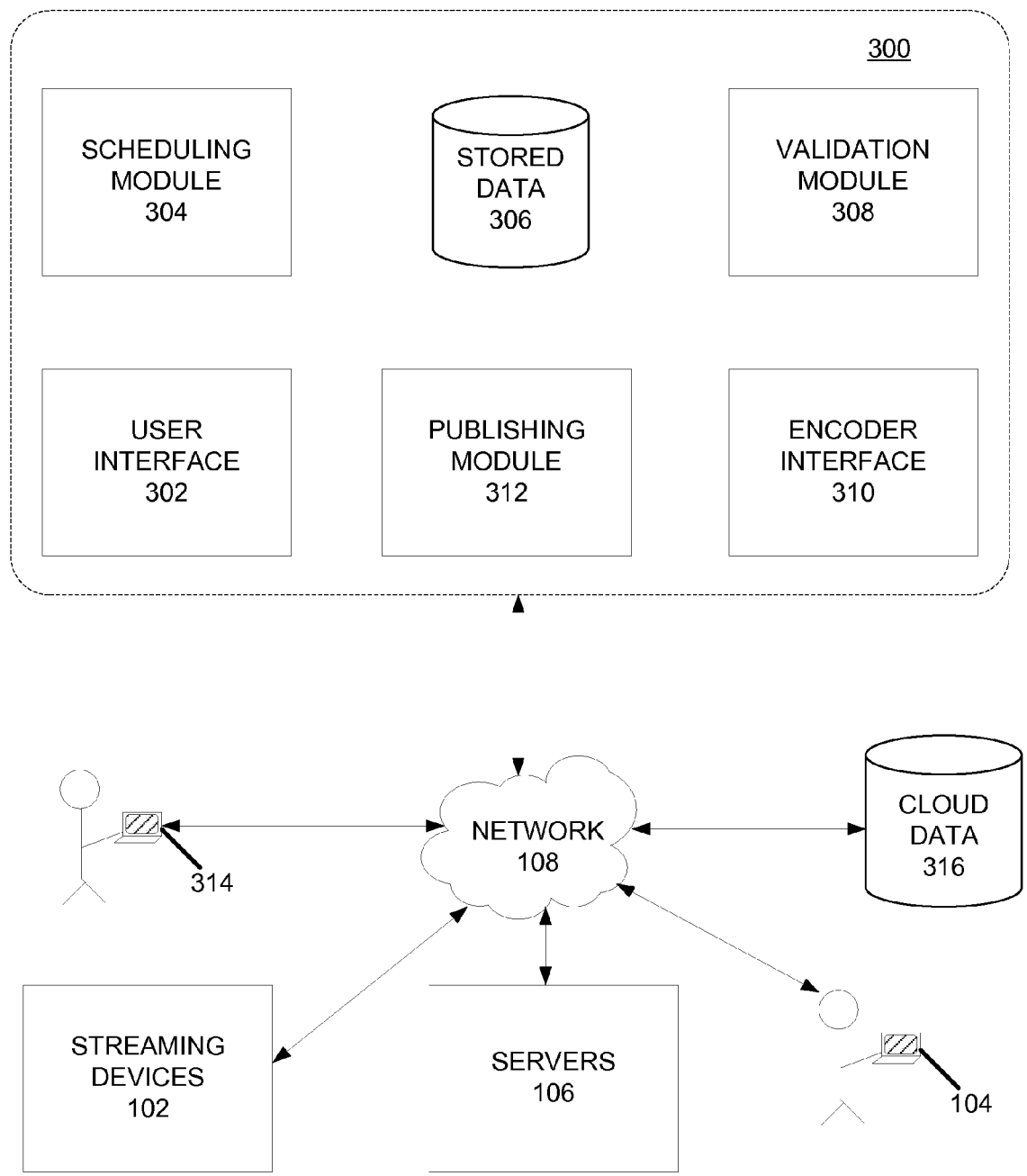
FIG. 3 depicts an example streaming server, according to one embodiment.

Referring now to FIG. 3, example components of one embodiment of a scheduling server 300 is depicted. Components can include either or both software and hardware modules. The scheduling server 300 can include a user interface module 302 executing on the scheduling server 300 that serves webpages that are delivered to client devices and displayed on a web browser executing on a smartphone, a tablet, a desktop computing device, or notebook computing device. For example, the user interface module 302 can serve web pages to a system administrator that the system administrator can use to configure the streaming of A/V content from streaming devices 102. In various configurations, some or all of the user interfaces can execute on user equipment such as client device using dedicated applications that interface with the user interface module 302. For example, in a configuration, the user interface can be an application or app designed to execute on client devices, such as a user's mobile computing device, tablet, and/or smartphone. In another configuration, a user interface can be an application designed to execute on client devices such as a personal computing device. Example messaging between the user interface module 302 of the scheduling server 300 and the users, system administrators, and client devices can include, but is not limited to, HTML, XML, webpages, cookies, messaging such as SMS, EMS, MMS, and other types of suitable messaging, including encrypted messages, and secure sockets, and so forth.

The scheduling server 300 can include a scheduling module 304 for setting schedules for the streaming devices 102 to stream A/V content to the origin server 122, which is explained in greater detail below. The scheduling server 300 can include a validation module 308 for checking the scheduling for conflicts or errors, authenticating users and sources of A/V content, and so forth. The scheduling server 300 can include an encoder interface 310 for communication with the streaming devices 102, such as to receive RESTful API requests and submit formatted responses, for example. Communication of information between the encoder interface 310 of the scheduling server 300 and streaming devices 102 can be accomplished by sending formatted responses over HTTP, or hypertext transfer protocol, using a RESTful API call. However, as would be understood in the art, communications between two or more computing devices can be enabled using any suitable protocol and networking interfaces including, but not limited to, the TCP suite of protocols, HTML, XML, webpages, cookies, secure sockets, proprietary protocols, and so forth. The scheduling server 300 can include a publishing module 312 for sending information about A/V content streams to the servers 106. For example, when a new scheduled event is created, a record containing information about the scheduled event and the A/V content can be sent to the edge server 124 so that users can subscribe to receive the event using their viewing device 104 and automatically receive the A/V content when it begins streaming at the scheduled time.

The scheduling server 300 can include a local data store 306. Data can be stored in the local data store 306, an external data store, schematically depicted as cloud data 316 in FIG. 3, or any other suitable local or network storage means. Each data store 306, 316 can be a repository of data for user information, system administrator information, viewer information, authentication information, configuration information for streaming devices 102, configuration information for viewing devices 104, edge server 124 information, scheduling information, error checking rules, scripting, A/V content data and information, and any other suitable information.

Figure 4:
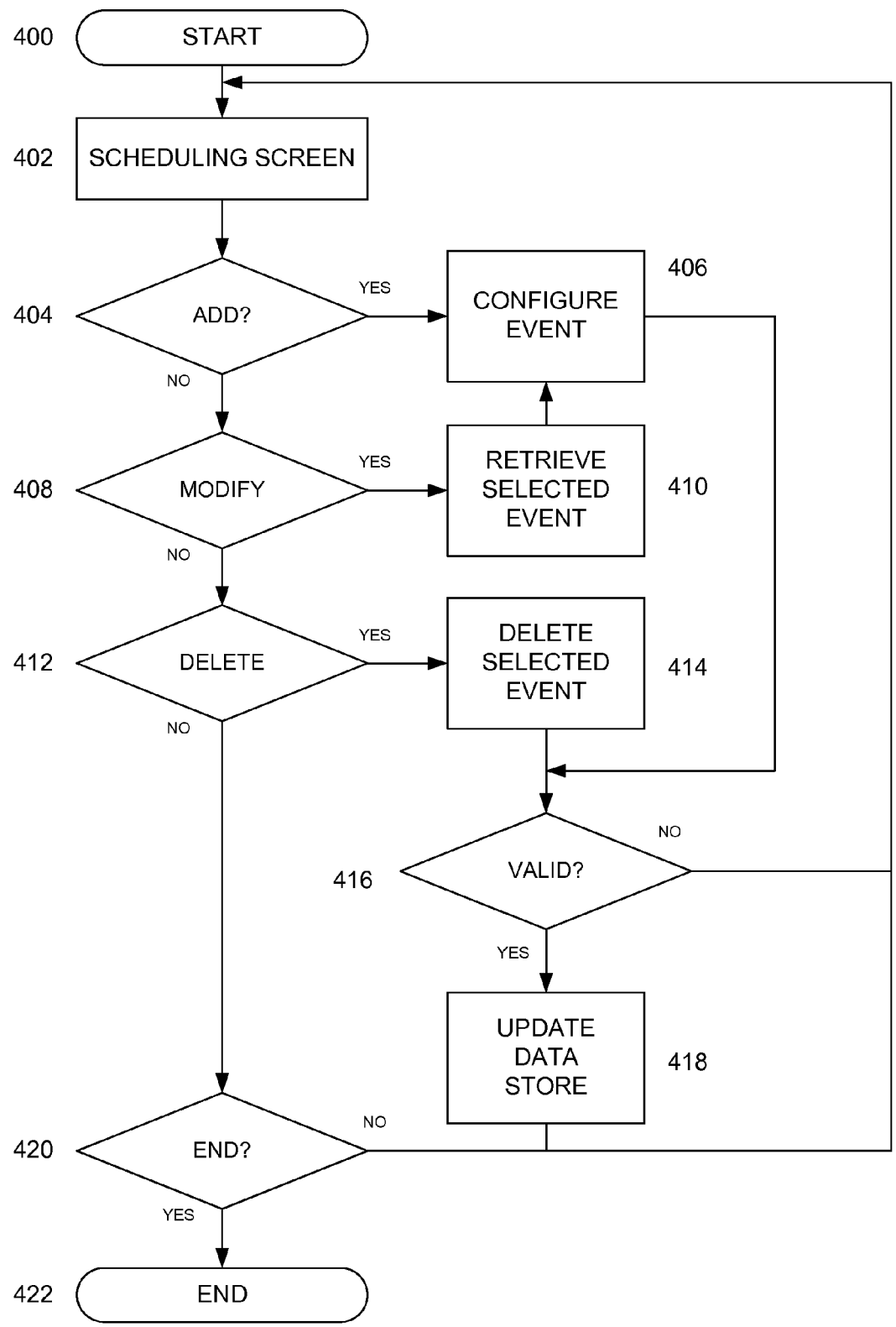
FIG. 4 depicts example operations for scheduling streaming events, according to one embodiment.

Referring now to FIG. 4, an example flow diagram of a scheduling process of the scheduling module 304 is presented. Processing starts at start block 400 when a user, such as a system administrator, logs into the user's account on the scheduling server 300. In a configuration the scheduling server 300 is a cloud-based management portal. Processing continues to process block 402.

In process block 402, the user interface 302 presents a scheduling screen for one or more streaming devices 102 to the system administrator. In a configuration, the scheduling screen can be presented to the system administrator using a PHP/MySQL™ web-based application of an automation scheduling application hosted on server infrastructure running an enterprise level operating system. A system administrator can remotely manage a streaming device 102, such as an encoder 112, and start and stop broadcasting at pre-determined dates and times by defining a broadcast schedule using the scheduling screen. The broadcast schedule for each account can be stored in a data store 306, 316. In a configuration, the data store 306, 316 is a MySQL™ database. The system administrator can access in real-time the status of each of the system administrator's streaming devices 102, and can determine whether a streaming device 102 is online, is synced to the current broadcast schedule, or is offline. On the scheduling screen, the system administrator is presented with a series of online tools including the selectable option to add, modify, or delete a broadcast scheduled event. Additionally, the administrator can override the broadcast schedule and manually start and stop a broadcast from a remote encoder. Processing continues to decision block 404.

In decision block 404, if the system administrator selected the option to add a broadcast scheduled event, then processing continues to process block 406, otherwise, processing continues to decision block 408.

In process block 406, the system administrator has the option to schedule a one-time or a recurring broadcast by specifying the start and end dates, the start and end times, viewer access, category, storage duration and data about recurring times for a broadcast scheduled event. In a configuration, the system administrator is presented with an option to make the scheduled broadcast event a periodically recurring event, such as a weekly recurring event. Examples of weekly recurring events can include house of worship services, educational classes, company meetings, and so forth. Processing continues to decision block 416.

In decision block 408, if the system administrator selected the option to modify or edit a broadcast scheduled event, then processing continues to process block 410, otherwise, processing continues to decision block 412.

In process block 410, a scheduled broadcast event selected by the system administrator is retrieved from the data store 306, 316 which can be the MySQL™ database.

Processing continues to process block 406 where the system administrator can specify changes to the start and end dates, the start and end times, viewer access, category, storage duration and recurring times for the selected broadcast scheduled event.

In process block 412, if the system administrator selected the option to delete a broadcast scheduled event, then processing continues to process block 414, otherwise, processing continues to decision block 420.

In process block 414, the system administrator can select a scheduled broadcast event to be deleted from the data store 306, 316 which can be the MySQL™ database. Processing continues to decision block 416.

In decision block 416, the operation select by the system administrator to add, modify, or delete a scheduled broadcast event in process blocks 406, 410, or 414 is validated. In a configuration, the validation module 308 can verify the user rights, and perform error checking of the added or modified broadcast scheduled event. For example, the validation module 308 can verify that the end time has not been configured to occur before the start time. The validation module 308 can use configurable rules to verify the details of the broadcast scheduled event. In a configuration (not shown) the system administrator can be prompted to correct the errors. If the system administrator has sufficient user rights and there are no errors, then processing continues to process block 418, otherwise processing returns to processing returns to process block 402.

In process block 418, the data store 306, 316 is updated with the addition, modification, or deletion of the scheduled broadcast event from process blocks 406, 410, or 414. Once a scheduled broadcast event is added or modified by the system administrator, a streaming device 102 can automatically synchronize with the scheduled events in the data store 306, 316 allowing for 100% unattended, automated live Internet streaming of live broadcasts of user-created A/V content. In a configuration, each scheduled broadcast event can be stored in a record, or row, of a MySQL™ database table. For example, each scheduled broadcast event can have a unique identifier, a date or day of the week to start, a start time, and an end time. In a configuration, one-time events can be stored or indexed separately from recurring events. In this configuration, one-time events can be given a higher priority than recurring events, thereby allowing a one-time event to override a recurring event. Processing continues to process block 402 where the added or modified scheduled broadcast event will be listed, and any deleted scheduled broadcast event will not be presented.

In decision block 420, if the scheduling server 300 shuts down, or if the system administrator logs out or is logged out, then processing terminates at end block 422, otherwise processing continues back to process block 402.

Figure 5:
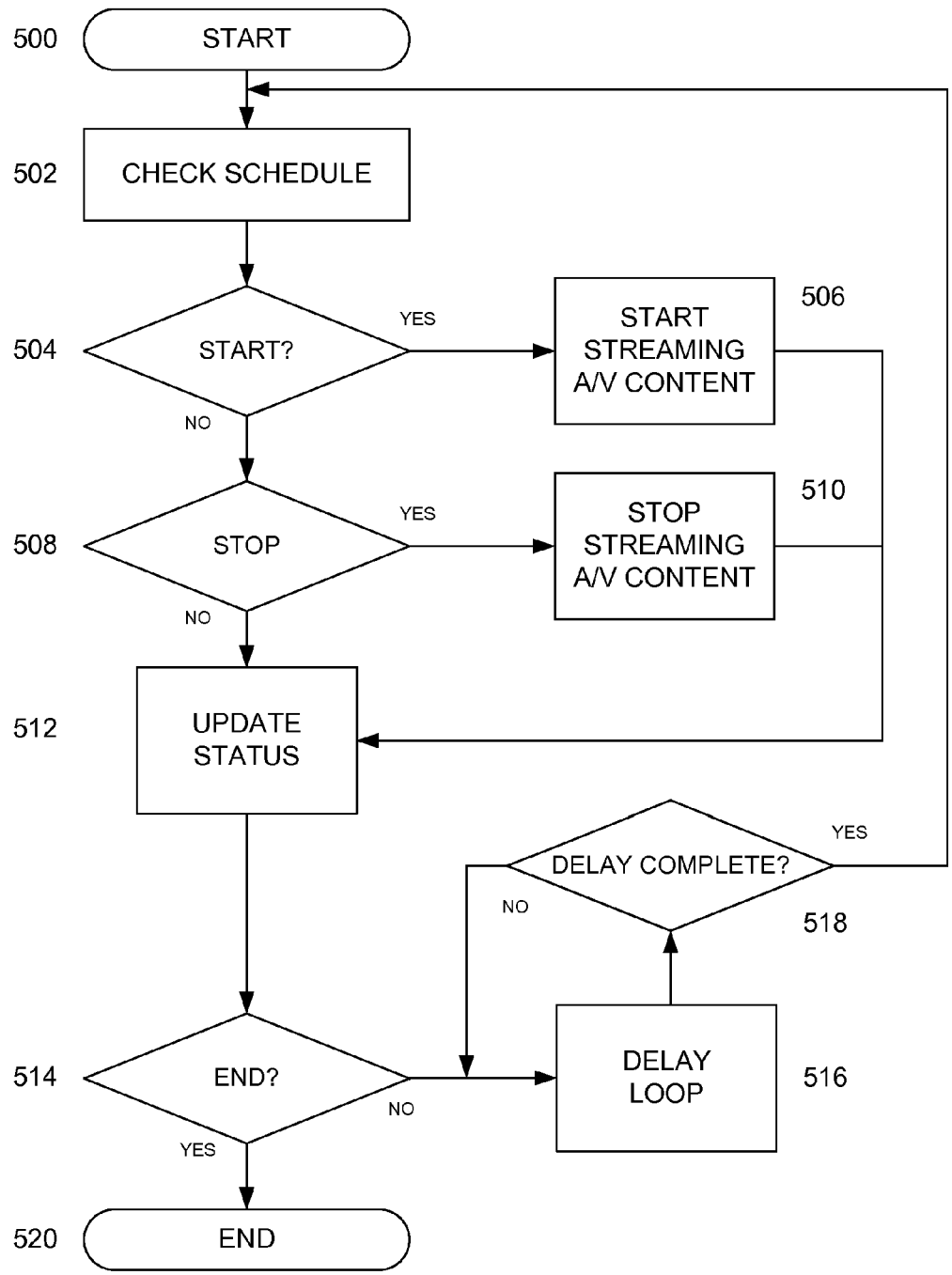
FIG. 5 depicts example operations of an A/V streaming encoder and a scheduling server of an automated real-time Internet streaming system, according to one embodiment.

Referring now to FIG. 5, an example flow diagram of a streaming device 102, such as an encoder 112, and the scheduling server 300 is presented. Processing starts at start block 500 and continues to process block 502.

In process block 502, an encoder 112 accesses the scheduling server 300 using a RESTful API call. The scheduling server 300 accesses data store 306, 316 for broadcast scheduled events associated with the encoder 112. For example, an encoder 112 can execute automation software such as a batch file in Windows, or a shell script on a Mac or Linux operating system, that causes the execution of PHP code that accesses the RESTful API of the scheduling server 300 that queries the MySQL™ for records, or rows, that match a unique account ID associated with the encoder 112 that is passed to the scheduling server 300 in each RESTful API call. All broadcast scheduled events associated with the unique account ID of the encoder 112 are determined by the scheduling server 300 and a response is provided to the encoder 112 using the RESTful API from the scheduling server 300. In a configuration, the scheduling server 300 can adjust the timestamp for the RESTful API call to the appropriate local time zone of the encoder based on account information if necessary. The scheduling server 300 checks the schedule of broadcast events by comparing the timestamp of the RESTful API call from the encoder 112 against start and stop times of each scheduled broadcast event stored in the MySQL™ database to determine a response to provide the encoder 112 using the RESTful API in order to start or stop a streaming process, or if no action needs to be taken. In the event of a conflict between different broadcast scheduled events, rules can be applied to determine which scheduled broadcast event takes precedence. For example, a one-time event can take precedence over a recurring event. Processing continues to decision block 504.

In decision block 504, if the date and time of when the encoder 112 made the RESTful API call to the scheduling server 300 meets the date and time requirements of a scheduled broadcast event for streaming A/V content, and streaming is not currently in process, then processing continues to process block 506 where the streaming A/V content is started after receiving the appropriate "start" response from the scheduling server 300 using the RESTful API. In a configuration, the scheduling server 300 using the RESTful API can check a flag or attribute associated with the record, or row, in the MySQL™ database for the scheduled broadcast event to determine whether streaming is currently in process. Otherwise, processing continues to decision block 508.

In process block 506, the encoder 112 starts streaming A/V content to the origin server 122. In a configuration, the encoder 112 can execute a broadcast script such as a Visual Basic Script if the encoder 112 is executing the Windows operating system, or a Shell Script if the encoder 112 runs the Mac or Linux operating systems. The specific broadcast script can be configured based on the particular encoding software and desired encoding profiled. For example, the script can execute Adobe Flash Media Live Encoder, Telestream Wirecast, ffmpeg, or Windows Media Encoder through a command line interface and configure the audio and video inputs, the bitrates, the resolution, and other information such as publishing points and credentials. The encoder 112 can stream the encoded A/V content to the origin server 122. The A/V content can be distributed by the origin server 122 to the edge servers 124 and the edge servers 124 can simultaneously stream the A/V content to awaiting viewers in real-time. Processing continues to process block 512.

In decision block 508, if streaming of A/V content is in process and the encoder 112 determines based on the response from the scheduling server 300 using the RESTful API that the date and time of the RESTful API call does not meet the date and time of any broadcast scheduled event, then processing continues to process block 510 where streaming is terminated, otherwise processing continues to process block 512.

In process block 510, the encoder 112 stops streaming A/V content, to the origin server 122. In a configuration, the encoder 112 can execute a stop broadcast script such as a Visual Basic Script if the encoder 112 is executing the Windows operating system, or a Shell Script if the encoder 112 runs the Mac or Linux operating systems. The specific stop broadcast script can be configured based on the particular encoding software and desired encoding profiled. For example, the script can execute Adobe Flash Media Live Encoder, Telestream Wirecast, ffmpeg, or Windows Media Encoder through a command line interface. Processing continues to process block 512.

In process block 512, one or more flags or attributes associated with the record, or row, in the MySQL™ database for the scheduled broadcast event can be updated by the scheduling server 300 using the RESTful API to indicate, for example, whether streaming is in process or has been stopped. In a configuration, a flag can be set to indicate whether the encoder 112 is streaming or is not streaming A/V content to the origin server. An attribute such as the current time of each successful RESTful API call for the encoder 112 can also be stored or updated. The timestamp can be used as heartbeat indicator to provide a system administrator with an indication that the encoder 112 is currently active and communicating periodically with the scheduling server 300 using the RESTful API. In an alternative configuration, process block 512 only updates one or more of the flags or attributes after the streaming has started or has been stopped in process blocks 506 and 510 respectively. Processing continues to decision block 514.

In decision block 514, if the encoder 112 is shut down, then processing terminates at end block 520, otherwise processing continues to process block 516.

In process block 516, a delay can be configured so that the encoder 112 only periodically, and at regular intervals, checks for broadcast scheduled events as described in process block 502. In a configuration, the delay can be implemented in software using a timer that is decremented or incremented as appropriate. In a configuration, the delay time can be any suitable period of time and can be configurable. In a configuration, the delay time is approximately 30-seconds. In this configuration, the schedule of broadcast scheduled events is checked for update approximately once every 30-seconds and the heartbeat indicator of process block 512 is updated approximately once every 30-seconds. In this way, if a new streaming event is added, or a current streaming event is deleted, the encoder 112 will make the appropriate change to start or stop streaming less than a minute after the update is made by the system administrator. Processing continues to decision block 518 to determine if the delay time has transpired.

In decision block 518, if the delay time has transpired, processing returns to process block 502, otherwise processing continues back to process block 516.

Generally, the operations described in process blocks and decision blocks 400 through 520 can be performed in any order, as would be understood by one of ordinary skill in the art. For example, decision tree of adding, modifying, or deleting a scheduled broadcast event in decision blocks 404, 408, and 412 respectively can be rearranged into any suitable order.

Figure 6:
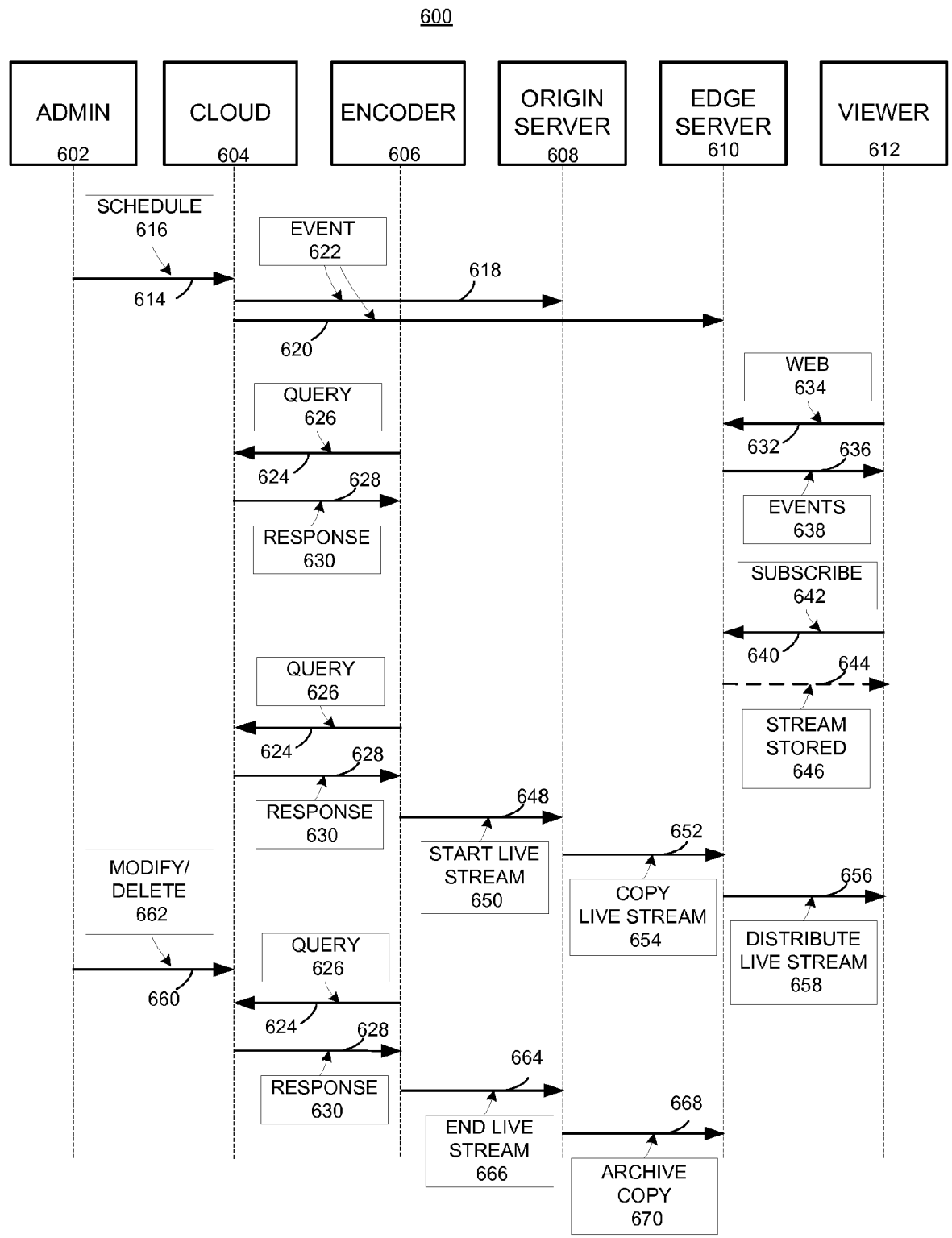
FIG. 6 depicts example communication flows of an automated real-time Internet streaming system, according to one embodiment.

Referring now to FIG. 6, example communication flows 600 of an automated real-time Internet streaming system 100 are presented. An administrator 602 can execute software, such as a web browser, application, or mobile app, which opens a communication link 614 to a cloud-based server 604 for scheduling streaming events for encoders. The administrator 602 sends a schedule request 616 to the cloud-based server 604 for a future live streaming event to be streamed.

Example communication links can be an IP (Internet Protocol) communication channel and use UDP (User Datagram Protocol) or TCP (Transmission Control Protocol) messaging to send messages between the computing device of the administrator 602, the cloud-based server 604, an encoder 606, the original server 608, the one or more edge servers 610 and viewing devices of the viewers 612, and any suitable message or protocols can be used. In a configuration, communication links can be the same communication link. For example, if TCP/IP is used, once a communication link is established between the computing devices, a new communication channel does not need to be established for future messaging. If a communication link is terminated or has timed out a new link may need to be established. In another configuration, communication links can be different communication links. For example, if UDP/IP is used, each communicated datagram can be considered to establish a new ephemeral communication link between the computing devices. Although the communication links are shown as individual links, a single communication channel can remain open and transmitting multiple different messages over the same communication link for a period of time as would be understood by one of ordinary skill in the art.

The cloud-based server 604 can open communication channels 618 and 620 to the origin server 608 and the edge server 610 respectively and send information about the streaming event 622. The origin server 608 and the edge server 610 can use the information about the streaming event 622 to prepare for the transmission of a live streaming event in the future.

At any point, a viewer 612 on a viewing device can open a communication channel 632 to find a listing of streaming events 638 on the edge server 610. In an example configuration, the viewer 612 sends a web-based request 634 using a web browser to the edge server 610 which in returns sends the list of events 638 over a communication channel 636 to the viewer 612. The list of events 638 can be archived A/V streams 646 and can also include future live streaming events to which the viewer 612 can subscribe and watch at some point in the future when the scheduled event begins to stream live. The viewer 612 can subscribe 642 over a communication link 640 to an event. If the event is an archived A/V stream 646, then the edge server 610 can begin streaming the archived A/V stream 646 over a communication link 644.

Periodically, as described above in reference to FIG. 5, the encoder 606 can open a communication link 624 to the cloud-based server 604 and send a query 626 using a RESTful API call to determine the appropriate action to take. The cloud-based server 604 can evaluate a list of scheduled streaming events and determine the appropriate formatted response 630 for the encoder over a communication link 628, such as a "start" or "stop" response 630. If no scheduled streaming events are currently active, the cloud-based server 604 responds with a "wait" response 630 causing the encoder 606 to wait for a specified period of time before trying again.

The encoder 606 will periodically continue to query 626 the cloud-based server 604. When the cloud-based server 604 determines that it is time to start the scheduled event 616, it responds to the encoder 606 with a "start" command, the encoder 606 will then open a communication link 648 to the origin server 608 and start streaming the live A/V stream 650 to the origin server 608. The origin server 608 will open communication links 652 to one or more edge servers 610 and copy the live A/V stream 654 to the edge servers 610. The edge servers 610 will open communication links to each viewer 612 that previously subscribed 642 to the event and distribute 658 the live stream to the viewers 612. Viewers 612 can also subscribe to ongoing live streaming events and the edge servers 610 will distribute 658 the live stream to those viewers 612 as well.

While the live streaming 650 is occurring, an administrator 602 can open a communication link 660 to the cloud-based server 604 and send an instruction to modify or delete 662 the scheduled live streaming event. When the encoder 606 periodically sends the next query 626 to the cloud-based server 604, the list of scheduled events will no longer include the live streaming event. Similarly, if the end time for the live streaming event has passed, the list of scheduled events will no longer include the live streaming event. The encoder 606 can open a communication link 664 with the origin server 608 and send an end message 666 to indicate that the live streaming has ended. The origin server 608 can open a communication link 668 to one or more edge servers 610 and send a copy 670 of the archived A/V stream to the edge servers 610, and viewers 612 can watch the archived A/V stream at any time as described above.

Automated real-time Internet streaming systems in accordance with the present disclosure can allow administrators to start, modify and stop live Internet broadcasts at their venues without human intervention by utilizing encoders or other devices running automation software. Administrators can manage their Internet streaming broadcasts remotely using a cloud-based scheduling application easily and effortlessly without any physical intervention with the onsite broadcasting system. For example, houses of worship can utilize the system to broadcast their services without having to hire a staff or find a volunteer to physically start and stop the broadcast at their venue. For example, an administrator can schedule a recurring weekly service at their house of worship using the cloud-based scheduling application. The house of worship can use an encoding device connected to a high-definition camera that automatically starts and stops the live broadcasts at the house of worship based on the scheduled times, thereby allowing congregants to view the live service in real time without having to physically attend the service. Additionally, or alternatively, a school administrator can outfit a classroom with this system and program the system to automatically broadcast classroom activities without requiring the teacher to start and stop the broadcast for each lecture. For example, a teacher can schedule daily lectures using the cloud-based scheduling application and an encoding device such as a computer with an attached or built-in webcam in her classroom can start and stop automatically at the appropriate times. The webcam can stream the lectures live to several pupils at home who are sick with the flu or otherwise unable to attend class.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

I claim:

1. An automated real-time streaming computing system, the automated real-time streaming computing system comprising instructions stored in a memory, which when executed by one or more processors of the automated real-time streaming computing system, cause the automated real-time streaming computing system to:
receive scheduling attributes for a scheduled event, wherein the scheduling attributes for the scheduled event comprise any of a start date, an end date, a start time, and an end time, and wherein the scheduled event is associated with an appliance identified with a unique ID, wherein the appliance is remote from the automated real-time streaming computing system;
store the scheduling attributes for the scheduled event in at least one database;
subsequent to receiving the scheduling attributes, receive a request from the appliance via an Application Programming Interface (API), wherein the request is correlated to the unique ID of the appliance and comprises appliance attributes;
compare the scheduling attributes of the scheduled event associated with the appliance identified by the unique ID to determine that the scheduled event is an active scheduled event based on the scheduling attributes;
determine appliance parameters for the active scheduled event based at least partially on the appliance attributes provided in the request;
subsequent to determining the encoding parameters for the active scheduled event, send a response to the appliance, wherein the response comprises a start streaming instruction, wherein the start streaming instruction further comprises the appliance parameters for the active scheduled event;
subsequent to sending the start streaming instruction to the appliance, receive from the appliance a media stream associated with the active scheduled event;
subsequent to receiving the media stream from the appliance, receive a subsequent request from the appliance;
subsequent to receiving the subsequent request, determine whether the active scheduled event is no longer active; and
when the active schedule event is no longer active, send a stop streaming instruction to the appliance, otherwise send a take no action instruction to the appliance, wherein the take no action streaming instruction further comprises the appliance parameters for the active scheduled event.

2. The automated real-time streaming computing system of claim 1, wherein the media stream comprises any of an audio stream, a video stream, an audio-video stream, a live feed of audio-video content, and user-created content.

3. The automated real-time streaming computing system of claim 1, wherein the encoding parameters are any of an audio bitrate, video bitrate, audio codec, video codec, video resolution, stream name, and publishing URL of each media stream for the appliance.

4. The automated real-time streaming computing system of claim 1, wherein the automated real-time streaming computing system comprises an origin server and the origin server receives the media stream from the appliance.

5. The automated real-time streaming computing system of claim 4, wherein the media stream utilizes the encoding parameters provided to the appliance by the server.

6. The automated real-time streaming computing system of claim 4, wherein the origin server receives the media stream from the appliance in substantially real-time.

7. The automated real-time streaming computing system of claim 4, wherein the instructions further cause the automated real-time streaming computing system to:
stream the media stream from the origin server to a destination server.

8. The automated real-time streaming computing system of claim 7, wherein the destination server is an edge server.

9. The automated real-time streaming computing system claim 4, wherein the instructions further cause the automated real-time streaming computing system to:
stream a modified version of the media stream from the origin server a destination server.

10. The automated real-time streaming computing system of claim 4, wherein the instructions further cause the automated real-time streaming computing system to:
record the media stream for on-demand streaming by one or more viewing devices.

11. The automated real-time streaming computing system of claim 1, wherein the instructions further cause the automated real-time streaming computing system to:
determine an operational state of the appliance based on whether a media stream is being received.

12. The automated real-time streaming computing system of claim 1, wherein the instructions further cause the automated real-time streaming computing system to:
receive a change to one or more scheduling attributes of the active scheduled event.

13. The automated real-time streaming computing system of claim 12, wherein the server sends the instruction to the appliance to either start streaming or stop streaming the media stream only in response to receiving a request from the appliance after receiving the change to the one or more attributes of the active scheduled event.

14. A computer-based method, comprising:
receiving, by an automated real-time streaming computing system, scheduling attributes for a scheduled event, wherein the scheduling attributes for the scheduled event comprise any of a start date, an end date, a start time, and an end time, and wherein the scheduled event is associated with an appliance having a unique ID, wherein the appliance is remote from the automated real-time streaming computing system;
storing, by the automated real-time streaming computing system, the scheduling attributes for the scheduled event in at least one database;
subsequent to receiving the scheduling attributes, receiving, by the automated real-time streaming computing system, a request from the appliance via an Application Programming Interface (API), wherein the request is correlated to the unique ID of the appliance and comprises an appliance attribute;
comparing, by the automated real-time streaming computing system, the scheduling attributes of the scheduled event associated with the appliance identified by the unique ID to determine that the scheduled event in the at least one database is an active scheduled event based on the scheduling attributes;
determining, by the automated real-time streaming computing system, encoding parameters for the active scheduled event based at least partially on the appliance attribute provided in the request;

subsequent to determining the encoding parameters for the active scheduled event, sending, by the automated real-time streaming computing system, a response to the appliance, wherein the response comprises a start streaming instruction, wherein the start streaming instruction further comprises the encoding parameters for the active scheduled event;

receiving, by the automated real-time streaming computing system, from the appliance a media stream associated with the active scheduled event;

subsequent to sending the start streaming instruction to the appliance, receiving, by the automated real-time streaming computing system, a subsequent request from the appliance;

subsequent to receiving the subsequent request, determine, by the automated real-time streaming computing system, whether the active scheduled event is no longer active based at least in part on the comparing operation; and when the active schedule event is no longer active, sending, by the automated real-time streaming computing system, a stop streaming instruction to the appliance, otherwise send a take no action instruction to the appliance.

15. The computer-based method of claim 14, wherein the media stream comprises any of an audio stream, a video stream, an audio-video stream, a live feed of audio-video content, and user-created content.

16. The computer-based method of claim 14, wherein the encoding parameters are any of an audio bitrate, video bitrate, audio codec, video codec, video resolution, stream name, and publishing URL of each media stream for the appliance.

17. An automated real-time streaming computing system, comprising:
   a server configured to
      receive scheduling attributes for scheduled events at remote locations, wherein the scheduled events are one-time events, reoccurring events, or combinations thereof, and wherein each scheduled event is associated with one or more appliances at the respective remote locations;
      receive a request from an appliance located at one of the remote locations, wherein the request is time-stamped with time and date information and comprises an appliance identifier and one or more appliance attributes;
      determine whether any of the scheduled events associated with the appliance is an active scheduled event based at least in part on the location of the appliance submitting the request and a comparison of the scheduling attributes with the time and date information; and
      respond to the appliance with a streaming instruction based on the determination that one of the scheduled events is an active schedule event, wherein the response comprises an encoding parameter for the active schedule event; and
   an origin server configured to
      receive at least one media stream transmitted by the appliance when the appliance is instructed to start streaming.

18. The automated real-time streaming computing system of claim 17, further comprising the appliance.

19. The automated real-time streaming computing system of claim 18, wherein the appliance comprises a network-enabled controller in configured to
   query, periodically, the server for the streaming instruction;
   receive, in response to the request, a response that includes the streaming instruction and at least one appliance parameter; and
   when in the streaming instruction comprises an instruction to start streaming, transmit at least one media stream, in substantially real-time, to an origin server based on appliance attributes.

20. The automated real-time streaming computing system of claim 19, wherein the network-enabled controller is further configured to terminate at least one media stream to the origin server when, subsequent to querying the server, the streaming instruction directs the appliance to stop streaming at least one media stream to the origin server.

* * * * *